United States Patent [19]
Aird

[11] Patent Number: 5,152,549
[45] Date of Patent: Oct. 6, 1992

[54] VEHICLE SAFETY APPARATUS HAVING A RETAINER FOR CLAMPING AN INFLATOR AGAINST A SUPPORT PLATE

[75] Inventor: Jeffrey S. Aird, Mesa, Ariz.

[73] Assignee: TRW Inc., Lyndhurst, Ohio

[21] Appl. No.: 689,005

[22] Filed: Apr. 22, 1991

[51] Int. Cl.⁵ .............................................. B60R 21/16
[52] U.S. Cl. ..................................... 280/728; 280/731
[58] Field of Search ............... 280/728, 731, 736, 741; 439/544, 547, 567, 571, 572

[56] References Cited

U.S. PATENT DOCUMENTS

| | | |
|---|---|---|
| 3,819,205 | 6/1974 | Dunford et al. |
| 3,944,176 | 3/1976 | Danko .................. 439/571 X |
| 4,325,568 | 4/1982 | Clark et al. |
| 4,668,040 | 5/1987 | Matsuzaki et al. ........... 439/571 |
| 4,793,631 | 12/1988 | Takada |
| 4,902,036 | 2/1990 | Zander et al. |
| 4,913,461 | 4/1990 | Cuevas |
| 5,011,181 | 4/1991 | Laucht et al. ................ 280/731 |

FOREIGN PATENT DOCUMENTS

| | | |
|---|---|---|
| 3817481 | 11/1989 | Fed. Rep. of Germany ...... 280/728 |
| 1-33267 | 5/1990 | Japan .................................. 280/728 |

*Primary Examiner*—Robert P. Olszewski
*Assistant Examiner*—Boris Milef
*Attorney, Agent, or Firm*—Tarolli, Sundheim & Covell

[57] ABSTRACT

A vehicle safety apparatus includes an inflator for inflating a vehicle occupant restraint such as an air bag, a support plate for attaching the inflator to the steering wheel of the vehicle, and a retainer for mounting the inflator on the support plate. The retainer has a fastening portion for fastening the retainer to the support plate, and a clamping portion for clamping the inflator to the support plate. At least one lead wire extends from the inflator and terminates in the wire connector. A portion of the inflator projects through an opening in the support plate. The inflator has a radially outwardly extending flange portion larger in diameter than the opening in the support plate. The clamping portion of the retainer clamps the flange portion of the inflator against the support plate. The retainer supports the wire connector in position relative to the inflator. The retainer also shields the lead wire of the inflator.

9 Claims, 4 Drawing Sheets

VEHICLE SAFETY APPARATUS HAVING A RETAINER FOR CLAMPING AN INFLATOR AGAINST A SUPPORT PLATE

BACKGROUND OF THE INVENTION

1. Technical Field

The present invention relates to an inflatable vehicle occupant restraint. More particularly, the present invention relates to an apparatus for securing an air bag inflator to a support plate for mounting the air bag inflator on a vehicle steering wheel.

2. Description of the Prior Art

It is common to use an air bag to protect an occupant of a vehicle upon the occurrence of sudden vehicle deceleration, such as occurs in a vehicle collision. An air bag for protecting the driver of a vehicle is typically mounted in the vehicle steering wheel. An inflator, when actuated, generates gas to inflate the air bag. The air bag and the inflator are secured to a support plate which is attached to the vehicle steering wheel.

U.S. Pat. Nos. 4,325,568 and 3,819,205 show typical structures for mounting an air bag and an air bag inflator on a vehicle steering wheel using threaded fasteners to secure the air bag and inflator to a support plate. U.S. Pat. No. 4,913,461 shows a structure in which a support plate is deformed radially inwardly to engage an annular retainer which maintains the air bag and air bag inflator in position.

SUMMARY OF THE INVENTION

The present invention is a vehicle safety apparatus including an inflator for inflating a vehicle occupant restraint, a support plate for attaching the inflator to a portion of the vehicle, and a retainer for mounting the inflator on the support plate. The retainer has a fastening portion for fastening the retainer to the support plate, and a clamping portion for clamping the inflator to the support plate.

A portion of the inflator projects through an opening in the support plate. The inflator has a radially outwardly extending flange portion larger in diameter than the opening in the support plate. The clamping portion of the retainer clamps the flange portion of the inflator against the support plate.

At least one electrical lead wire extends from the inflator and terminates in a wire connector which connects with a wiring harness of the vehicle. The lead wire is located in part between the inflator and the retainer, and thus is protected from damage by the retainer. The retainer also supports the wire connector in position relative to the inflator. Thus, the retainer performs three functions, namely, it (i) clamps the inflator to the support plate, (ii) protects the electrical lead wire, and (iii) supports the wire connector.

BRIEF DESCRIPTION OF THE DRAWINGS

The foregoing and other features of the present invention will become apparent to one skilled in the art upon a consideration of the following description of the invention with reference to the accompanying drawings, in which.

DESCRIPTION OF A PREFERRED EMBODIMENT OF THE INVENTION

Figure 1:
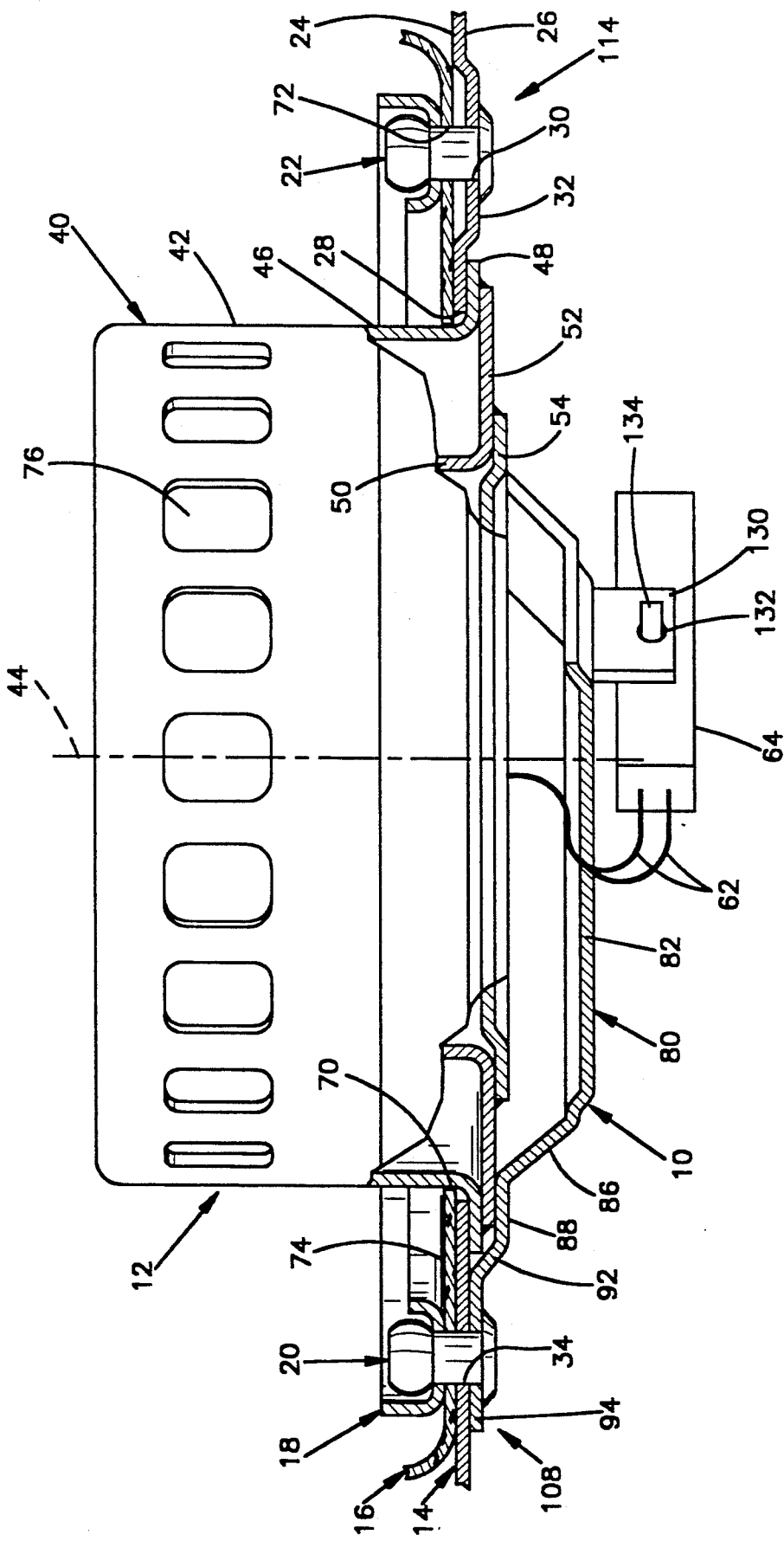
FIG. 1 is a view with portions in section of a vehicle safety apparatus in accordance with the present invention.

The present invention relates to a vehicle safety apparatus and particularly to a retainer for mounting an air bag inflator to a support plate to be mounted on a vehicle steering wheel. The present invention is applicable to various vehicle safety apparatus constructions. As representative of the present invention, FIG. 1 illustrates a retainer 10 which secures an air bag inflator 12 to a support plate 14. The support plate 14 is attached to a vehicle steering wheel (not shown) in a known manner. The inflator 12 generates gas for inflating an air bag 16 which is secured by a bag retaining ring 18 to the support plate 14. A plurality of fasteners such as rivets 20 and 22 clamp together the retainer 10, the inflator 12, the support plate 14, the air bag 16, and the bag retaining ring 18.

The support plate 14 is a generally flat metal plate having an upper major side surface 24 and a lower major side surface 26. A circular central opening 28 extends through the mounting plate 14. Eight rivet openings are spaced equally in a circle about the central opening 28. At four of the rivet openings designated 30, the material of the support plate 14 is depressed from the overall plane of the support plate 14 to form a circular riveting pad 32. At the other four openings, designated 34, the support plate is flat.

The inflator 12 includes a housing 40 having a central cylindrical portion 42 with a central axis 44. The housing 40 includes a diffuser cup 46 having flange 48 extending radially outwardly in a direction perpendicular to the axis 44. The housing 40 also includes a combustor cup 50 welded inside the diffuser cup 46. The combustor cup 50 has a flange 52 extending radially outwardly in a direction perpendicular to the central axis 44. The flange 52 of the combustor cup 50 partially overlies and is welded to the flange 48 of the diffuser cup 46. The housing 40 further includes a cover 54 that partially overlies and is welded to the flange 52 of the combustor cup 50.

A quantity of gas generating material (not shown) is located in the housing 40. The gas generating material is a known material which when ignited generates nitrogen gas for inflating the air bag. The inflator 12 also includes an igniter (not shown) which is actuatable to ignite the gas generating material in a known manner.

Electrical lead wires 62 extend from the inflator 12. The lead wires 62 terminate in a wire connector 64. The wire connector 64 connects to electric circuitry (not shown) of the vehicle. Upon the occurrence of sudden vehicle deceleration, the lead wires 62 receive an ignition signal from the vehicle circuitry. The lead wires 62 transmit the ignition signal to the igniter in the inflator 12 to energize the inflator 12. When the inflator 12 is energized, gas generated by the inflator 12 flows radially outwardly through a plurality of openings 76 in the inflator housing 40, into the air bag 16, to inflate the air bag 16 in a known manner.

The air bag 16 has a central opening 70 (FIG. 4) through which the central cylindrical portion 42 of the inflator 12 extends. A portion 74 of the air bag 16 extends radially outwardly from the central opening 70 and overlies the upper major side surface 24 of the support plate 14. This portion 74 of the air bag 16 has eight rivet openings 72 spaced in a circle and aligned with the openings 30 and 34 in the support plate 14. Radially outwardly from the rivets 20 and 22, the air bag 16 extends away from the support plate 14, and is folded around the inflator 44 in a known manner.

Figure 2:
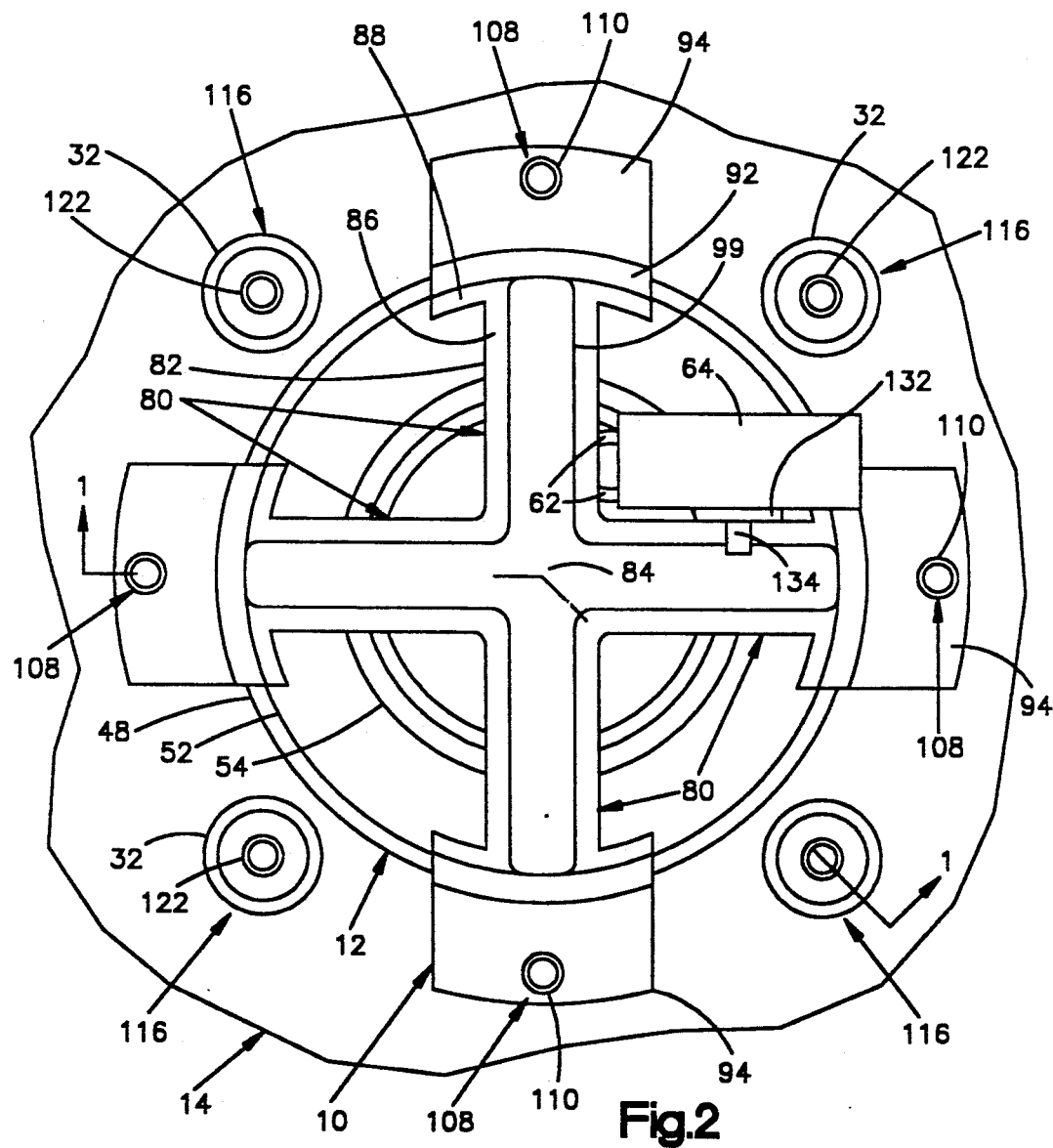
FIG. 2 is a bottom plan view of the apparatus of FIG. 1.
Figure 3:
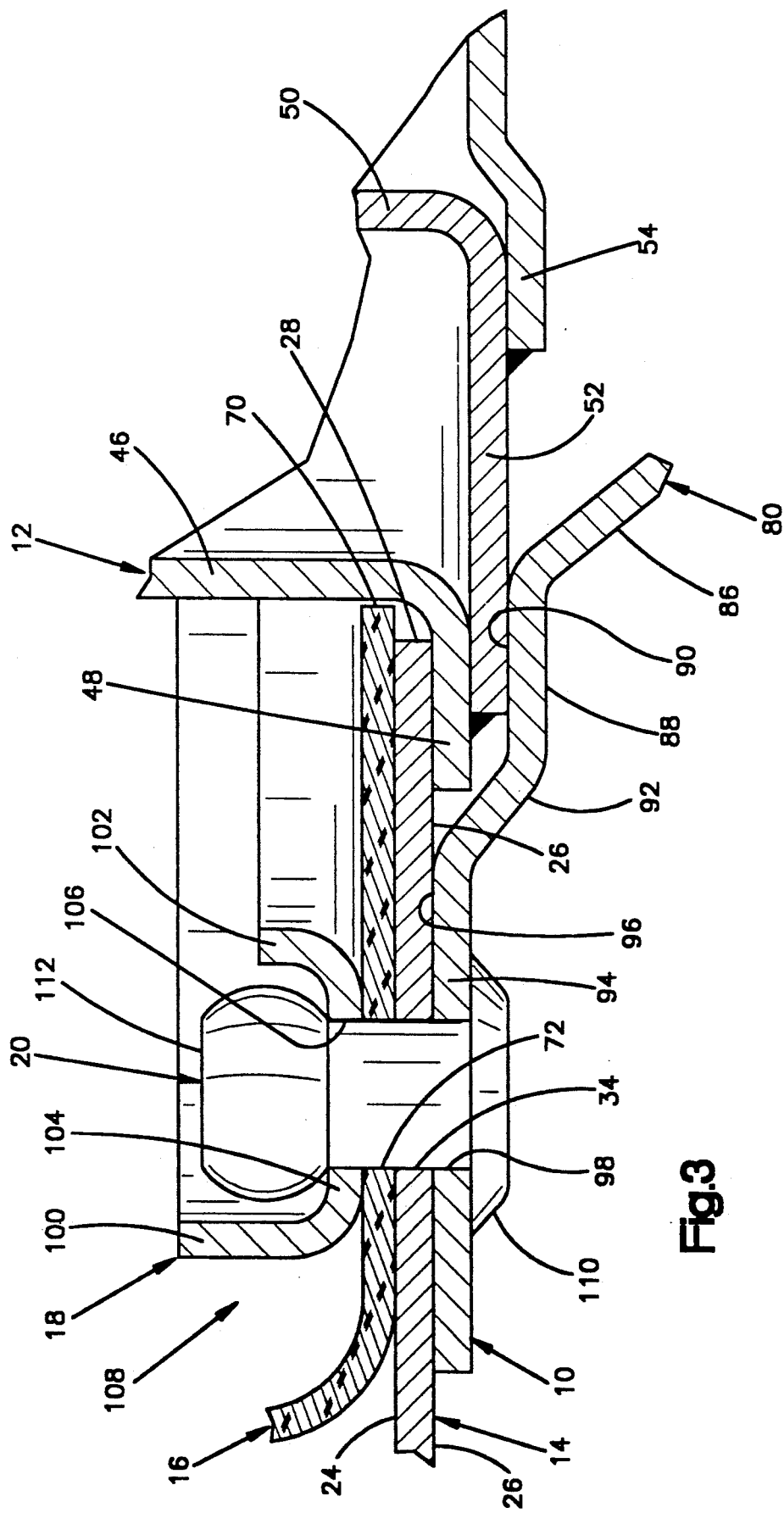
FIG. 3 is an enlarged sectional view of a portion of FIG. 1.

The retainer 10 in the preferred embodiment is an X-shaped metal stamping having four legs 80 (see FIG. 2). Each leg 80 includes an inner portion 82 (see FIG. 1) extending radially outwardly from a central area 84 of the retainer 10. A first angled portion 86 of the leg 80 extends radially outwardly and axially upwardly as viewed in FIG. 1 from the radially outer end of the inner portion 82. Each leg 80 also includes a clamping portion 88 which extends radially outwardly from the first angled portion 86 in a direction generally perpendicular to the central axis 44. The clamping portion 88 has a flat upper side surface 90 (FIG. 3). A second angled portion 92 extends radially outwardly and axially upwardly from the clamping portion 88.

Each leg 80 terminates in a mounting foot 94 (best seen in FIGS. 3 and 4) which extends radially outwardly of the second angled portion 92, in a direction generally perpendicular to the central axis 44. The mounting foot 94 has a flat upper side surface 96. A rivet opening 98 extends axially through the mounting foot 94. A reinforcing rib 99 (FIG. 2) is formed in each leg 80, to allow the weight of the retainer 10 to be reduced while maintaining its load-carrying capability.

The bag retaining ring 18 (FIGS. 3 and 4) is an annular piece of metal having a J-shaped cross sectional configuration. The bag retaining ring 18 includes an axially extending outer ring portion 100 and an axially extending inner ring portion 102 joined by a flat, radially extending bottom portion 104. Eight rivet openings 106 extend through the flat bottom portion 104 of the bag retaining ring 18. The rivet openings 106 are spaced in a circle and are aligned with the openings 72 in the air bag 16 and with the openings 30 and 34 in the support plate 14.

FIG. 3 illustrates in detail how the retainer 10 secures the inflator 12 to the support plate 14 at each of the four retainer mounting locations designated 108. The retainer 10, the support plate 14, the air bag 16, and the bag retaining ring 18 are positioned so that the rivet opening 98 in the retainer mounting foot 94, the rivet opening 34 in the support plate 14, the rivet opening 72 in the bag 16, and the rivet opening 106 in the bag retaining ring 18 are all aligned with each other. The upper side surface 90 of the retainer clamping portion 88 engages the combustor cup flange 52. The diffuser cup flange 48 engages the lower major side surface 26 of the support plate 14.

The rivet 20 extends axially through the aligned rivet openings. The rivet head 110 engages the mounting foot 94 of the retainer 10. The opposite end 112 of the rivet 20 is expanded to engage the upper surface of the bottom portion of the bag retaining ring 18. The rivet 20, through the bag retaining ring 18 and the bag 16, clamps the mounting foot 94 of the retainer 10 to the support plate 14. The retainer clamping portion 88 clamps the flanges 52 and 48 and thus the inflator 12 to the support plate 14. This is also the case at each of the other three retainer mounting locations 108 (FIG. 2). Thus, the inflator 12 is securely clamped around its circumference to the support plate 14.

As can be seen in FIGS. 1 and 3, the clamping portion 88 of each retainer leg 80 is offset axially from the mounting foot 94. The axial offset between these two parts may be defined as the distance between the upper side surface 90 of the clamping portion 88 and the upper side surface 96 of the mounting foot 94, as measured in the direction parallel to the axis 44. The axial offset between the clamping portion 88 and the mounting foot 94 of the retainer 10 is slightly less than the combined thickness of the diffuser cup flange 48 and of the combustor cup flange 52. If the offset between the clamping portion 88 and the mounting foot 94 were greater than the combined thickness of the diffuser cup flange 48 and of the combustor cup flange 52, the retainer 10 would not securely clamp the inflator 12 to the support plate 14.

Figure 4:
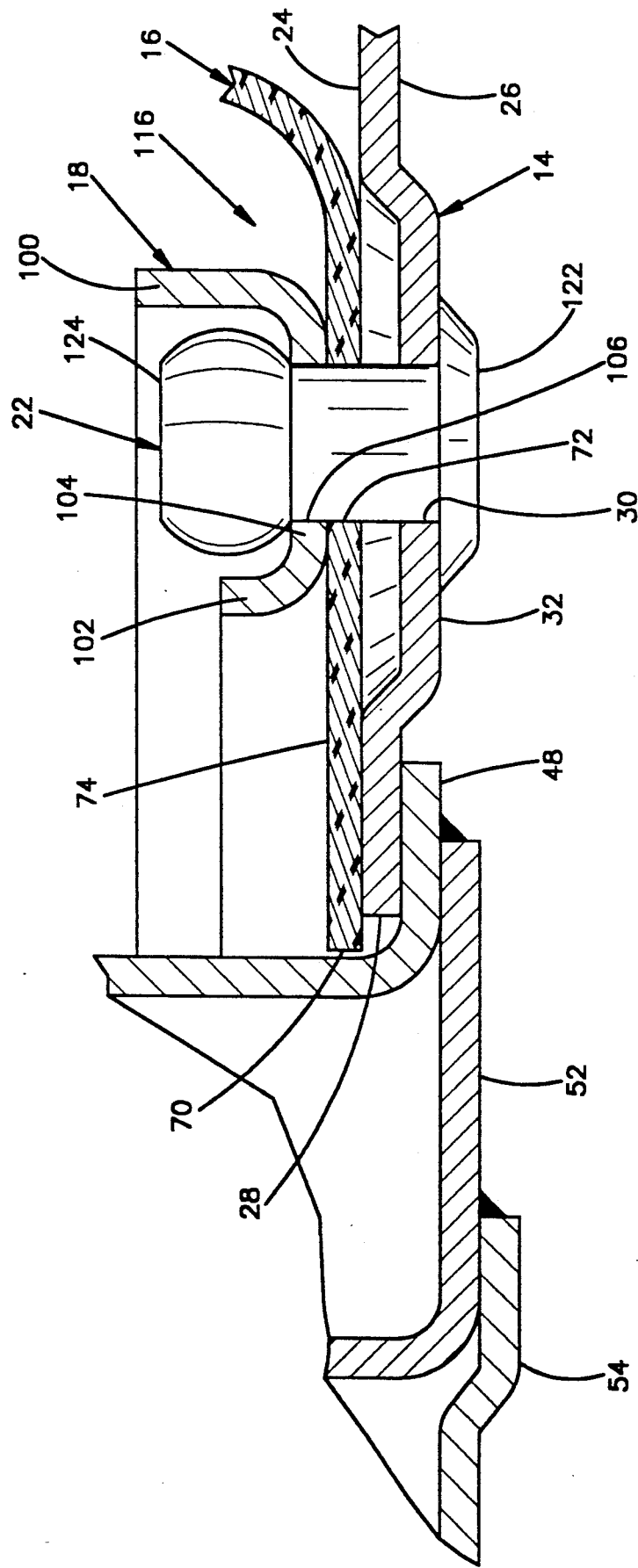
FIG. 4 is an enlarged sectional view of another portion of FIG. 1.

FIG. 4 illustrates in detail how the bag retaining ring 18 secures the bag 16 to the support plate 14, at the four bag mounting locations designated 116. At each location 116, the rivet opening 106 in the bag retaining ring 18 is aligned with the rivet opening 72 in the bag 16 and with the rivet opening 30 in the support plate 14. The head 122 of the rivet 22 engages the riveting pad 32 of the support plate 14. The opposite end 124 of the rivet 22 is expanded to engage the upper surface of the bottom portion of the bag retaining ring 18. The axial clamping action of the rivet 22 clamps the bag retaining ring 18 and the bag 16 to the support plate 14. The circular riveting pad 32 of the support plate 14 is depressed from the overall plane of the support plate 14 by the same distance as the thickness of the material of the retainer 10. Therefore, a rivet 22 which is the same length as the rivet 20 can be used to clamp the bag retaining ring 18 to the support plate 14, even though the retainer 10 is not clamped at this location.

The retainer 10 includes a mounting tab 130 (FIG. 1). The mounting tab 130 may be a separate piece attached to the metal stamping which forms the body of the retainer 10, but is preferably part of the same one-piece metal stamping. An opening 132 (FIGS. 1 and 2) extends through the mounting tab 130. The wire connector 64 has a clip 134 which extends through the opening 132 in the mounting tab 130. The mounting tab 130 thus supports the wire connector 64 in position relative to the inflator 12. Accordingly, the retainer 10, besides securing the inflator 12 to the support plate 14, also serves as a mounting structure for the inflator lead wire connector 64.

The lead wires 62 are located in part between the inflator 12 and the retainer 10. The retainer 10 thus shields the lead wires 62 at the location where they exit the body of the inflator 12. The retainer 10 also protects the lead wires 62 in the event the assembled apparatus is, for example, accidentally dropped before it is mounted to the vehicle steering wheel.

The support plate 14 is preferably made of steel or aluminum, depending on the vehicle manufacturer's preference and the tradeoff between weight, cost and strength. The support plate 14 may alternatively be made of a composite material. The bag retaining ring 18 is preferably made of steel. The retainer 10 is preferably made of a high strength, low alloy steel. The air bag 16 may be made of any suitable known material. The rivets 20 and 22 are preferably blind rivets such as Cherry brand "Q" rivets.

It should be noted that the present invention is applicable to a retainer for mounting an inflator for a passenger side air bag as well as to a retainer for mounting on air bag inflator on a vehicle steering wheel. Also, it should be noted that the X-shaped configuration of the retainer 10 and the number of fasteners used (eight) are not limiting. A retainer in accordance with the present invention can have a different configuration and can be mounted using a different number of fasteners. Further, a retainer in accordance with the present invention can be used for mounting an inflator having a mounting flange spaced axially from the end of the inflator, as well as for mounting an inflator such as the inflator 12 in which the diffuser cup flange 48 and the combustor cup flange 52 are located at one axial end of the inflator 12.

From the above description of the invention, those skilled in the art will perceive improvements, changes and modifications in the invention. Such improvements, changes and modifications within the skill of the art are intended to be covered by the appended claims.

I claim:

1. A vehicle safety apparatus comprising:
an air bag;
an inflator for inflating said air bag;
a support plate for attaching said inflator to a portion of a vehicle;
a retainer for mounting said inflator on said support plate, said retainer having a fastening portion for fastening said retainer to said support plate and a clamping portion for clamping said inflator to said support plate;
a lead wire extending from said inflator and terminating in a wire connector;
said support plate having surface means for defining an opening through said support plate, a portion of said inflator projecting through said opening in said support plate;
said inflator having a radially outwardly extending flange portion larger in diameter than said opening in said support plate;
said clamping portion of said retainer clamping said flange portion of said inflator against said support plate;
said retainer including means for supporting said wire connector in position relative to said inflator;
a bag retaining ring secured to said support plate and clamping said air bag against said support plate to secure said air bag in position relative to said inflator;
said support plate having first and second oppositely facing major side surfaces, said retainer clamping said inflator flange portion against said first major side surface of said support plate, said bag retaining ring clamping said air bag against said second major side surface of said support plate;
said support plate including surface means defining fastener openings in said support plate located radially outwardly of said inflator opening;
a first plurality of fasteners extending through a first plurality of said fastener openings and through openings in said retainer and in said air bag and in said bag retaining ring to clamp together said retainer and said support plate and said air bag and said bag retaining ring at a first plurality of fastening locations;
a second plurality of fasteners extending through a second plurality of said fastener openings and through openings in said air bag and in said bag retaining ring to clamp together said support plate and said air bag and said bag retaining ring at a second plurality of fastening locations; and
said retainer being an X-shaped member having four radially extending legs and a respective mounting foot at an outer end of each leg, each one of said mounting feet including surface means for defining one of said fastener openings in said retainer, said clamping portion of said retainer comprising a respective clamping surface on each one of said retainer legs disposed radially inwardly of said mounting foot.

2. A vehicle safety apparatus comprising:
an air bag;
an inflator for inflating said air bag;
a support plate for attaching said inflator to a portion of the vehicle;
a retainer for mounting said inflator on said support plate, said retainer having a fastening portion for fastening said retainer to said support plate and a clamping portion for clamping said inflator to said support plate;
said support plate having surface means for defining an inflator opening through said support plate, a portion of said inflator projecting through said inflator opening in said support plate;
said inflator having a radially outwardly extending flange portion larger in diameter than said inflator opening in said support plate;
said clamping portion of said retainer clamping said flange portion of said inflator against said support plate;
said inflator flange portion having first and second oppositely facing major side surfaces, said first side surface of said inflator flange portion engaging said support plate to block movement of said inflator in a first direction relative to said support plate, and said second side surface of said inflator flange portion engaging said retainer clamping portion to block movement of said inflator in a second direction opposite to said first direction relative to said support plate;
a bag retaining ring secured to said support plate and clamping said air bag against said support plate to secure said air bag in position relative to said inflator;
said support plate having first and second oppositely facing major side surfaces, said retainer being disposed on one side of said support plate and clamping said inflator flange portion against said first major side surface of said support plate, said bag retaining ring being disposed on the other side of said support plate and clamping said air bag against said second major side surface of said support plate;
said support plate including surface means defining a plurality of fastener openings in said support plate located radially outwardly of said inflator opening;
a first group of fasteners extending through a first group of said fastener openings and through openings in said retainer and in said air bag and in said bag retaining ring to clamp together said retainer and said support plate and said air bag and said bag retaining ring at a first plurality of fastening locations;
a second group of fasteners extending through a second group of said fastener openings and through openings in said air bag and in said bag retaining ring to clamp together said support plate and said air bag and said bag retaining ring at a second plurality of fastening locations; and
said retainer being an X-shaped member having four radially extending legs and a respective mounting foot at an outer end of each leg, each one of said mounting feet including surface means for defining one of said fastener openings in said retainer, said clamping portion of said retainer comprising a respective clamping surface on each one of said retainer legs disposed radially inwardly of said mounting foot.

3. A vehicle safety apparatus comprising:

a support plate having an inflator opening and a plurality of first fastener openings located radially outward of said inflator openings;

an inflator for inflating a vehicle occupant restraint, said inflator having a portion projecting through said inflator opening in said support plate and having a radially outwardly extending flange, said flange being larger in diameter than said inflator opening and having a radially outer edge located radially between said inflator opening and said first fastener openings; and a retainer for mounting said inflator on said support plate, said retainer having a fastening means for fastening said retainer to said support plate, and having a clamping means for clamping said inflator to said support plate:

said fastening means comprising a fastening portion of said retainer located radially outward of said radially outer edge of said flange on said inflator, said fastening portion including a plurality of second fastener openings aligned with said first fastener openings in said support plate; and said clamping means comprising a clamping portion of said retainer located radially inward of said radially outer edge of said flange on said inflator, said clamping portion having a clamping surface means for clamping said flange against said support plate.

4. An apparatus as defined in claim 3 further comprising a lead wire extending from said inflator and terminating in a wire connector, said retainer further comprising a supporting means for engaging said wire connector and securing said wire connector in position relative to said inflator.

5. An apparatus as defined in claim 3 wherein said retainer further has an angled portion located between said fastening portion and said clamping portion, said angled portion spacing said clamping portion axially and radially from said fastening portion.

6. An apparatus as defined in claim 3 wherein said retainer has a central portion and a plurality of legs extending radially outward from said central portion, each of said legs having a mounting foot portion; said clamping portion being integral with said mounting foot portion and located radially inward of said mounting foot portion, said mounting foot portions including said second fastener openings.

7. An apparatus as defined in claim 6 wherein said retainer has a total of four of said legs, each of said mounting foot portions including a single one of said second fastener openings.

8. An apparatus as defined in claim 6 wherein said support plate has a plurality of third fastener openings, each of said third fastener openings being spaced circumferentially from each of said mounting foot portions of said legs of said retainer.

9. An apparatus as defined in claim 8 wherein said retainer is formed of sheet metal having a uniform thickness at said fastening portion, said support plate being formed of sheet metal with a uniform thickness and having a plurality of recessed portions, each of said recessed portions of said support plate having a depth equal to the thickness of said retainer at said fastening portion, and each including one of said third fastener openings.

* * * * *